(12) United States Patent
Jackson (10) Patent No.: US 8,649,271 B2
(45) Date of Patent: Feb. 11, 2014

(54) TESTING NETWORK EQUIPMENT (75) Inventor: Dean Jackson, Vancouver (CA)

(73) Assignee: Ixia, Calabasas, CA (US)

( * ) Notice: Subject to any disclaimer, the term of this patent is extended or adjusted under 35 U.S.C. 154(b) by 387 days.

(21) Appl. No.: 12/797,518

(22) Filed: Jun. 9, 2010

(65) Prior Publication Data
US 2011/0182191 A1 Jul. 28, 2011

Related U.S. Application Data (60) Provisional application No. 61/298,152, filed on Jan. 25, 2010.

(51) Int. Cl.
*G06F 11/00* (2006.01)

(52) U.S. Cl.
USPC ............ 370/241; 370/419; 714/100; 717/168

(58) Field of Classification Search
None
See application file for complete search history.

(56) References Cited

U.S. PATENT DOCUMENTS

| | | | |
|---|---|---|---|
| 5,247,517 A | 9/1993 | Ross et al. | |
| 5,329,412 A | 7/1994 | Stefansky | |
| 5,477,531 A | 12/1995 | McKee | |
| 5,600,632 A | 2/1997 | Schulman | |
| 5,787,253 A | 7/1998 | McCreery et al. | |
| 5,805,927 A | 9/1998 | Bowes et al. | |
| 5,822,520 A | 10/1998 | Parker | |
| 5,974,237 A | 10/1999 | Shurmer et al. | |
| 6,028,847 A | 2/2000 | Beanland | |
| 6,172,989 B1 | 1/2001 | Yanagihara | |
| 6,233,256 B1 | 5/2001 | Dieterich et al. | |
| 6,295,557 B1 | 9/2001 | Foss | |
| 6,321,264 B1 | 11/2001 | Fletcher | |
| 6,545,979 B1 | 4/2003 | Poulin | |
| 6,717,917 B1 | 4/2004 | Weissberger et al. | |
| 6,728,214 B1 * | 4/2004 | Hao et al. ...................... | 370/241 |
| 6,950,405 B2 | 9/2005 | Van Gerrevink | |
| 7,143,153 B1 | 11/2006 | Black et al. | |
| 7,187,683 B1 | 3/2007 | Sandoval et al. | |
| 7,231,558 B2 | 6/2007 | Gentieu et al. | |
| 8,174,991 B1 * | 5/2012 | Trivedi ......................... | 370/241 |
| 2002/0183969 A1 | 12/2002 | Hanes et al. | |
| 2003/0033406 A1 * | 2/2003 | John et al. ..................... | 709/224 |
| 2003/0231741 A1 | 12/2003 | Rancu et al. | |
| 2004/0236866 A1 | 11/2004 | Dugatkin et al. | |
| 2005/0169585 A1 | 8/2005 | Aronson et al. | |
| 2006/0045019 A1 * | 3/2006 | Patzschke et al. ............ | 370/241 |
| 2006/0045432 A1 | 3/2006 | Anderson | |
| 2006/0291857 A1 * | 12/2006 | Mackenzie et al. ............... | 398/9 |
| 2007/0025261 A1 | 2/2007 | Ginsberg et al. | |
| 2007/0088981 A1 | 4/2007 | Noble et al. | |
| 2007/0115833 A1 | 5/2007 | Pepper | |
| 2007/0291654 A1 | 12/2007 | Pepper | |
| 2008/0112332 A1 | 5/2008 | Pepper | |
| 2009/0265142 A1 | 10/2009 | Liu et al. | |

OTHER PUBLICATIONS

World Intellectual Property Organization, International Search Report and Written Opinion for International Application No. PCT/US2011/022017, Mail Date Mar. 23, 2011.

* cited by examiner

Primary Examiner — Kevin C Harper
(74) Attorney, Agent, or Firm — SoCal IP Law Group LLP; John E. Gunther; Steven C. Sereboff (57) ABSTRACT There are disclosed a system, a test module and a method for testing a network device. One or more test modules may be plugged into respective ports of the network device in replacement of respective pluggable transceiver modules. Each test module may include at least one of a traffic generator and a traffic receiver to transmit and receive, respectively, test traffic via the network device.

33 Claims, 8 Drawing Sheets

TESTING NETWORK EQUIPMENT

RELATED APPLICATION INFORMATION

This patent claims priority from the provisional patent application No. 61/298,152, filed Jan. 25, 2010, entitled NO-OPTICS, NO CABLES, NETWORK TEST SYSTEM.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and receiving traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module with the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

A plurality of concurrent streams may be combined to form the test traffic output from a source port. The streams within the test traffic may be transmitted sequentially or concurrently through interleaving. The interleaving may be balanced, unbalanced, and distributed among the represented streams. To test a modern "triple play" network and network equipment, the test traffic may contain simulated data, audio, and video streams.

The test traffic may be divided into a plurality of "traffic items", where each traffic item is effectively a separate test from each other traffic item. Test traffic for some or all of a plurality of traffic items may be generated and transmitted concurrently. Each traffic items may include a plurality of streams, and each stream may typically be a portion of a single traffic item.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, a hardware "unit" also means a collection of hardware, which may be augmented by firmware and/or software, which may be on a larger scale or a smaller scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

In this description, the term "logic" is intended to encompass combinatorial logic circuits, sequential elements such as latches and registers, adaptive logic circuits and/or processors controlled by firmware, and other digital circuits that perform a specified function. An engine or unit may include a plurality of logic elements.

Throughout this description, elements appearing in schematic and block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits. In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
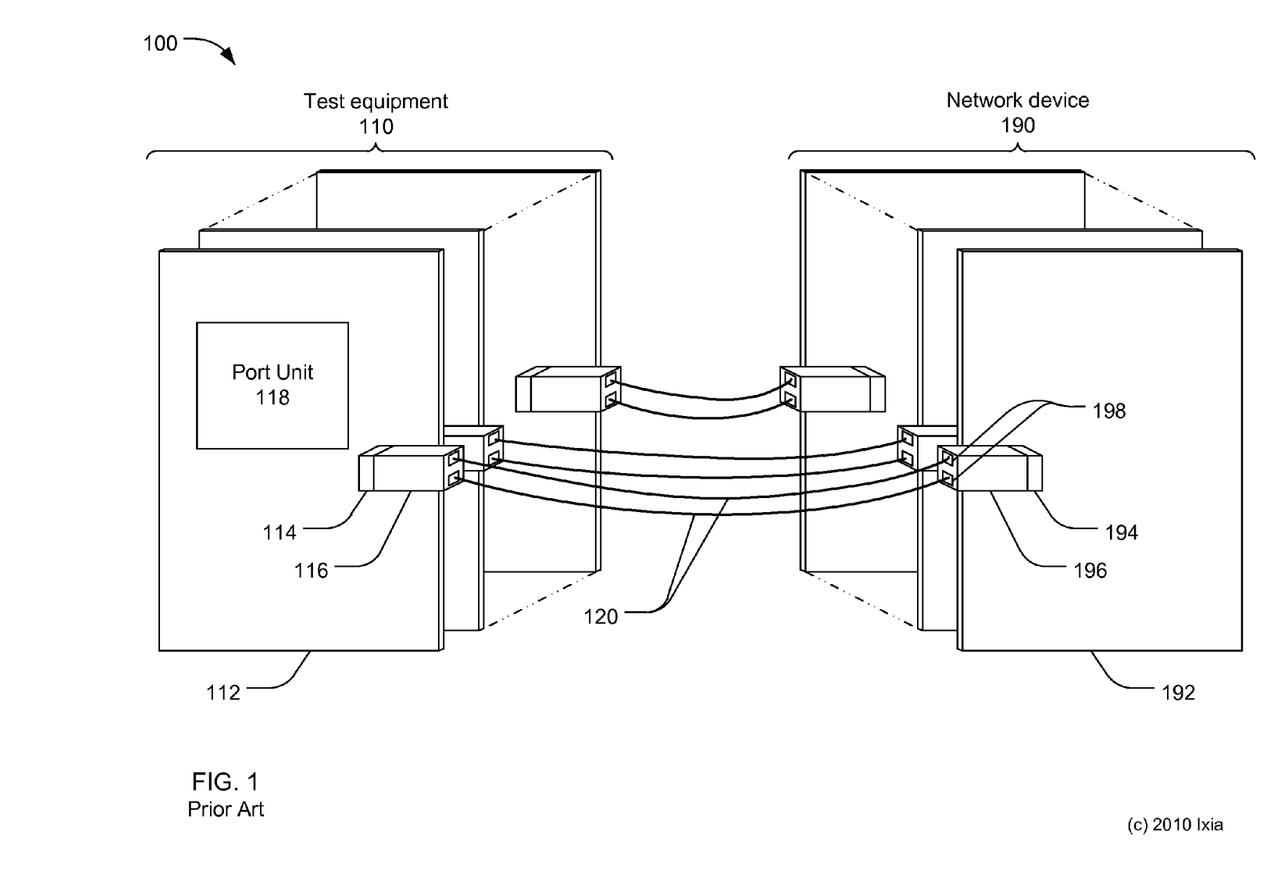
FIG. 1 is a schematic block diagram of a test set-up.

FIG. 1 shows a schematic block diagram of a test set up including a network device 190 to be tested and test equipment 110. The network device 190 may be a router, a switch, a load balancer, or some other type of equipment for use within a communications network. The network device 190 may be one or more physical units coupled to perform an integrated function such as two or more routers clustered to form a single logical unit. The network device 190 may include or be all or a portion of a network.

As shown in the example of FIG. 1, the network device 190 may include a plurality of network cards 192, also commonly called line cards or blades. The network cards 192 may be mounted in a chassis and coupled to a mother-board which are not shown in FIG. 1. The network device 190 may include other cards, such as switch fabric cards or processor cards, which are also not shown in FIG. 1. The network device 190 may be configured in some other physical form that does not include network cards.

The network device 190 may include a plurality of ports for communications with other equipment such as the test equipment 110. A low-end switch or router may have, for example, 32, 48 or 64 ports. A high-end network device may have 1000 or more ports.

Each network card 192 may provide one or more ports. The ports of the network device 190 may be connected to corresponding ports of the test equipment 110 by links 120. The links 120 may be wire cables or optical fiber cables. Communications between the network device 190 and the test equipment 110 over the links 120 may conform to a standard such as an ETHERNET standard, a SONET (synchronous optical networking) standard, a FIBRE CHANNEL standard, or some other communications standard. Each standard may define a plurality of communications rates. The links 120 may be implemented using different optical fiber types, optical wavelengths, and source laser types depending on the required communications rate and the length of the links. Communications via optical fiber is typically half-duplex, such that separate optical fiber links 120 are provided for communications in opposing directions.

To allow each network card 192 to be compatible with a variety of different communications links, each network card may include a connector 194 to receive a pluggable transceiver module 196. Network cards that provide a plurality of ports may include a corresponding plurality of connectors 194 for pluggable transceiver modules 196. Each pluggable transceiver module may transmit and receive via separate links 120 which, in turn, may plug into connectors 198 on the transceiver module. Each pluggable transceiver module 196 may communicate with the corresponding network card 192 through a predetermined (for each type of transceiver module) electrical interface accessed at the connector 194. Each pluggable transceiver module 196 may receive electrical power from the corresponding network card through the connector 194. Thus each network card 192 can be adapted to a variety of communications links 120 through selection and installation of an appropriate pluggable transceiver module 196.

A variety of pluggable transceiver modules have been developed in accordance with multiple source agreements between competing manufacturers. For example more than 40 different small form-factor pluggable (SFP) transceiver modules are available for communications rates from 155 MHz to 4.25 GHz and maximum link lengths from 500 meters to 160 kilometers. SPF transceiver modules are available for use with copper cables or fiber optic links. SPF transceiver modules for use with fiber optic links may operate at optical wavelengths of 850 nm, 1310 nm, or numerous wavelengths between 1470 and 1610 nm. SPF transceiver modules intended for communications over short distances may use light emitting diodes or vertical cavity lasers and may be compatible with multimode optical fiber. SPF transceiver modules intended for communications over longer distances may use distributed feedback or Fabry-Perot lasers and may be compatible with single-mode optical fiber.

Similarly, a variety of enhanced small form-factor pluggable (SPF+) transceiver modules are available for communications rates up to 10.2 GHz and 10-GHZ small form-factor pluggable (XFP) transceiver modules are available for communications rates up to 11.3 GHz. CFP transceiver modules, currently in development, will support communications rates up to 100 GHz. Other types of pluggable optical transceiver modules include GBIC, XPAK, X2, and XENPAK transceiver modules. Additional types of pluggable transceiver modules may be developed.

The test equipment 110 may also include a plurality of test network cards 112. The test network cards 112 may be mounted in a chassis and coupled to a mother-board which are not shown in FIG. 1. The test equipment 110 may include other cards, such as a processor card, which are also not shown in FIG. 1. In the example of FIG. 1, the test equipment 110 and the network device 190 are shown having the same number of network cards. The test equipment 110 may include more or fewer network cards than the network device 190. The test equipment 110 may be configured in some other physical form that does not include network cards.

The test equipment 110 may include a plurality of ports for communications with the network device 190. Each test network card 112 may provide one or more ports. Each port of the equipment under test 190 may be connected to a corresponding port of the test equipment 110 by the links 120. To allow each test network card 112 to be compatible with a variety of different optical links, each test network card 112 may include a connector 114 to receive a pluggable transceiver module 116. Test network cards 112 that provide a plurality of ports may include a corresponding plurality of connectors 114 for pluggable transceiver modules 116.

Each transceiver module 116 of the test equipment 110 may be coupled via links 120 to a counterpart transceiver module 196 of the network device 190. Counterpart transceiver modules must operate at the same optical wavelength and must be compatible with the links 120 that connect the counterpart modules. However, counterpart transceiver modules need not be identical. For example, SFP+, XFP, X2, and XPK transceiver modules are available to provide 10 GHZ ETHERNET communications over single-mode optical fiber using an optical wavelength of 1310 nm. One of these types of modules may be used in the test equipment 110 and a different one of these types of modules may be used in the network device.

In order to test the equipment under test 190, at least some of the test network cards 112 in the test equipment 110 may generate and transmit test traffic to the network device 190, and at least some of the test network cards 112 may receive test traffic from the network device 190. Packets transmitted out of one of the ports of the test equipment 110 may subsequently be received by one or more other ports of the test equipment 110.

To test the network device 190, suitable pluggable transceiver modules may be installed for every port to be tested, if such modules are not already present. Compatible pluggable transceiver modules may then be installed for a comparable number of ports of the test equipment 110, and fiber optics links may be connected between counterpart ports of the network device 190 and the test equipment 110. The pluggable transceiver modules, the fiber optics cables, and the labor required to install the transceiver modules and cables may represent a significant portion of the cost of performing the test.

Figure 2:
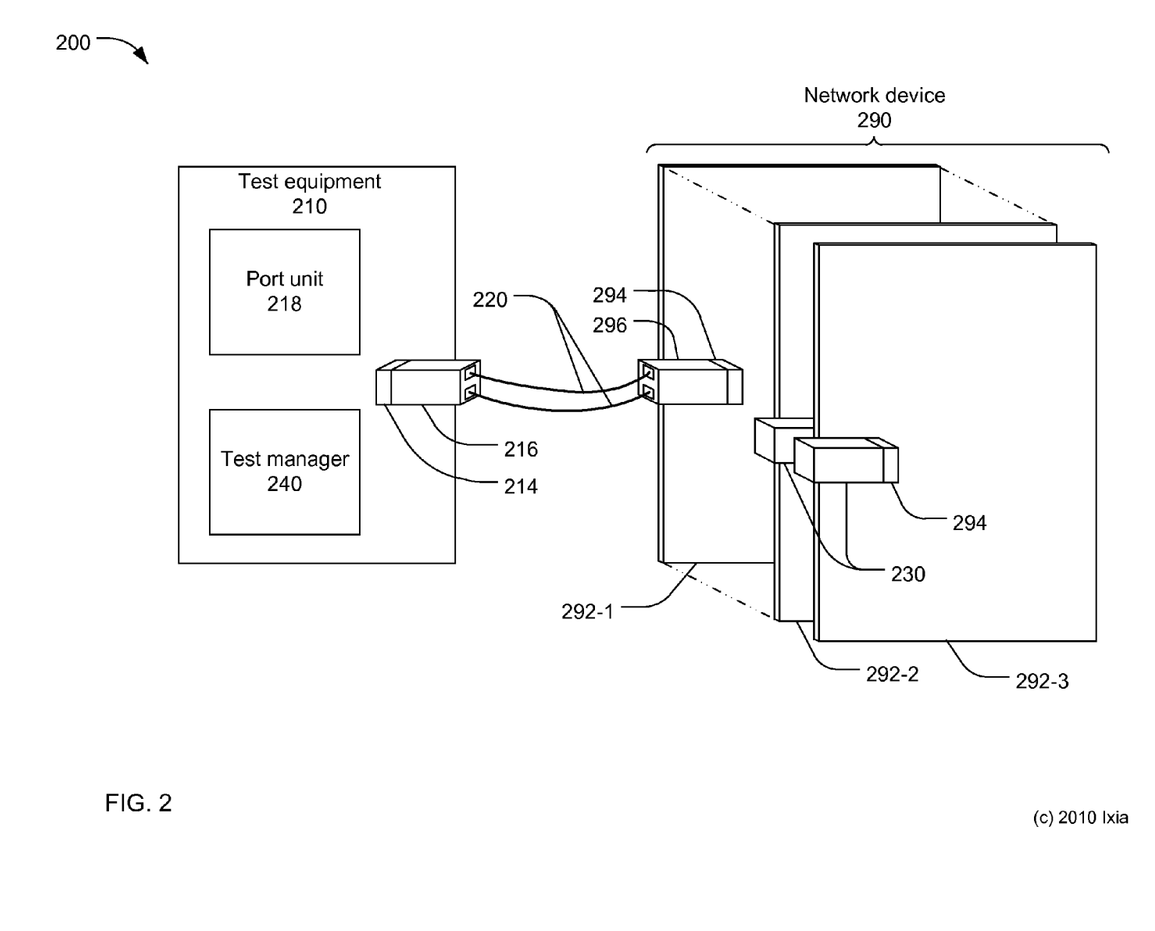
FIG. 2 is a schematic block diagram of a test set-up.

FIG. 2 shows a schematic block diagram of another test set-up 200 including a network device 290 to be tested and test equipment 210. The network device 290 may be a router, a switch, a load balancer, or a cluster of two or more devices. The network device 290 may be or be all or a portion of a network.

The network device 290 may include a plurality of network cards 292, of which network cards 292-1, 292-2, and 292-3 are identified in FIG. 2. As shown in FIG. 2, each network card 292-1, -2, -3 may have one port for communications with other equipment such as the test equipment 210. A network card may provide more than one port.

In a traditional test set-up, as previously shown in FIG. 1, each port of a network device may be connected to a corresponding port of the test equipment by communications links. In the exemplary test set-up of FIG. 2, a port on network card 292-1 may communicate with a counterpart port on network card 212 within the test equipment 210 via a pluggable transceiver module 296, communications links 220, and a second pluggable transceiver module 216. However, in the test set-up of FIG. 2, the ports on network cards 292-2 and 292-3 may communicate with pluggable test modules 230 installed on the network cards 292-2 and 292-3 in replacement of, or instead of, pluggable transceiver modules.

Each pluggable test module 230 may be physically interchangeable with the replaced pluggable transceiver module, which is to say that each test module may plug into a connector 294 on the corresponding network card in replacement of a pluggable transceiver module without interference with other portions of the network card or the network device. Further, each pluggable test module may be mechanically mounted to the corresponding network card using the mounting provisions, if any, provided for the replaced pluggable transceiver module. The external dimensions of the pluggable test modules 230 may or may not be identical to the external dimensions of the replaced pluggable transceiver modules.

Each pluggable test module 230 may be electrically interchangeable with the replaced pluggable transceiver module, which is to say that each pluggable test module may electrically connect to the corresponding network card via the connector 294 using a predetermined interface for the replaced pluggable transceiver module. Additionally, each pluggable test module 230 may be configured to operate from one or more electrical power forms supplied by the network device 290. Each pluggable test module 230 may receive electrical power exclusively from the network device 290. Each pluggable test module may be configured to consume no more electrical power than the replaced pluggable transceiver module.

For example, a test module for use in replacement of an SFP+ pluggable transceiver module may have a power consumption less than or equal to 1.5 watts. A test module for use in replacement of an XFP pluggable transceiver module may have a power consumption less than or equal to 3.5 watts. Both SFP+ and XFP specifications allow for several classes of devices having different power consumption limits. In some applications, the power consumption of an SFP-compatible pluggable test module may need to be less than or equal to 1 watt, and the power consumption of an XFP-compatible pluggable test module may need to be less than or equal to 2.5 watts or 1.5 watts. Although specifications for CFP pluggable transceiver modules have not been finalized, a test module for use in replacement of a CFP pluggable transceiver module may have a power consumption less than or equal to the specified maximum power consumption of the replaced CFP module.

Each pluggable test module 230 may communicate with a test manager 240 within or coupled to the test equipment 210 via the network card 292-1, the pluggable transceiver modules 216, 296, the links 220, and the port unit 218. Since each pluggable test module 230 communicates with the test manager 240 via the network device 290, the pluggable test module 230 will be referred to herein as an "in-band" pluggable test module (to distinguish from "wireless" and "wired" pluggable test modules to be described subsequently). Each in-band pluggable test module 230 may receive configuration data contained in packets transmitted from the port unit 218 through the network device 290. Conversely, each in-band pluggable test module 230 may report test results via packets transmitted through the network device 290 to the port unit 218.

The in-band pluggable test modules 230 may transmit and receive test traffic via the network device 290. Specifically, at least some in-band pluggable test modules 230 may generate and transmit test traffic in accordance with stream definition data stored within each pluggable test module. At least some pluggable test modules 230 may receive test traffic and accumulate traffic statistics and other test results. Some or all of the pluggable test modules 230 may both transmit and receive test traffic.

Each pluggable test module 230 may receive configuration data from the test manager 240 before or during a test session.

The configuration data may include an address or plurality of addresses which the in-band pluggable test module may emulate during a test session. The configuration data may further include stream definition data for one or more packet streams that the in-band pluggable test module may generate and transmit during the test session, and instructions for how the in-band pluggable test module should accumulate and report test statistics and other test results. The configuration data may also include criteria and instructions for capturing and storing specific received packets. Each in-band pluggable test module 230 may report test statistics, captured packets, and other test results to the test manager 240 periodically or upon request during a test session, and may report all accumulated test results to the test manager after the test session.

In some circumstances, an in-band pluggable test module may generate and transmitted packets that are based, in part, on received packets. However, the in-band pluggable test modules are not equivalent to loopback modules which merely repeat or retransmit received packets. All of the packets generated and transmitted by the in-band pluggable test modules may be based, to some extent, on stream definition data stored within the in-band pluggable test module.

Since each in-band pluggable test module 230 may receive a limited amount of electrical power from the network device 290, the capabilities of individual in-band pluggable test modules may be limited compared to the capabilities of a port unit such as the port unit 218. For example, the limited electrical power available to an in-band pluggable test module may limit the amount of memory contained in the module. Limited memory may constrain the number of different packet streams that can be generated by the test module and may limit the number of packet groups for which traffic statistics may be accumulated. Limited memory may also constrain the total size of packets captured by an in-band pluggable test module, or may require that an in-band pluggable test module be configured for accumulating traffic statistics or capturing packets, but not both, at any one time. Limited electrical power may also limit the processing capability within an in-band pluggable test module which may, for example, limit the number of protocols that the in-band pluggable test module can use for communications.

Each in-band pluggable transceiver module 230 may have a limited capacity to receive packets via the network device 290 prior to receiving configuration data. In a typical test situation, the configuration data sent to each pluggable transceiver module may differ, to at least some extent, from the configuration data sent to every other pluggable transceiver module. To allow each individual in-band pluggable test module 230 to receive appropriate configuration data, at least one predetermined unique address may be assigned or embedded in each in-band pluggable test module 230. For example, the predetermined address may be a MAC (media access control) address or an IP (internet protocol) address. The predetermined unique address may only be used for communication of configuration data. Once configured, each in-band pluggable test module 230 may emulate a virtual device or network having a large plurality of addresses.

In order to measure temporal performance parameters such as minimum and maximum latency times and packet arrival rates, each in-band pluggable test module 230 may include a time clock synchronized to a master time clock within the test equipment 210. The time clocks within the in-band pluggable test modules 230 may be synchronized by exchanging synchronization packets with the test equipment 210 via the network device 290. The time synchronization packets may conform, for example, to IEEE (Institute of Electrical and Electronics Engineers) Standard 1588, also known as the Precision Time Protocol. For further example, each in-band pluggable test module 230 may include a time code receiver that receives a wireless time code signal. The wireless time code signal may be, for example, a GPS (global positioning system) signal or a proprietary signal transmitted from the test equipment 210.

When the in-band pluggable test modules 230 communicate with the test manager 240 through the network device 290, no cables are required for the individual in-band pluggable test modules. As few as a single pair of optical cables (links 220) may have to be installed to test the network device 290. Alternatively, a mixture of in-band pluggable test modules and cable connections may be used depending on test requirements. For example 5% or 20% or some other portion of the ports of the network device 290 may be connected via optical cables to port units, such as the port unit 218, in the test equipment 210. The remaining ports of the network device 290 may receive in-band pluggable test modules. The reduction in the number of cables may significantly reduce the cost and time required to test a network device. Additionally, the electrical power required to test the network device may be substantially lower than that of the conventional test set-up, as shown in FIG. 1, since the in-band pluggable test modules 230 may be powered by the network device 290 using electrical power previously reserved for pluggable optical transceiver modules.

When the in-band pluggable test modules 230 communicate with the test manager 240 through the network device 290, configuration packets, report packets, and time synchronization packets (if required) communicated between the test modules 230 and the test manager 240 add to the load on the network device 290. In some circumstances the load of the configuration, report, and time synchronization packets may impact the performance of the network device 290 and thus affect, to some extent, the results of the tests being performed.

Figure 3:
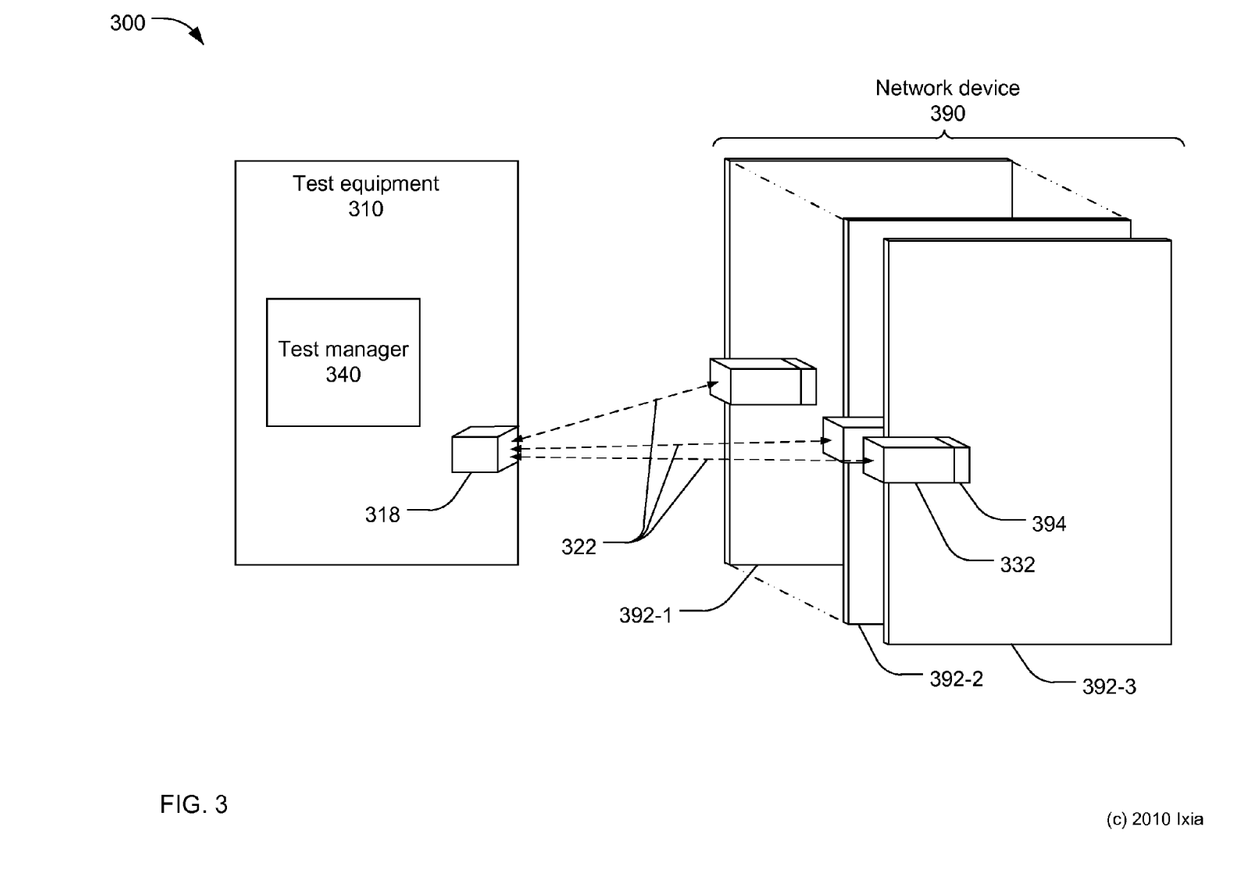
FIG. 3 is a schematic block diagram of a test set-up.

FIG. 3 shows a schematic block diagram of another test set-up 300 including a network device 390 to be tested and test equipment 310. The network device 390 may be a router, a switch, a load balancer, or a cluster of two or more devices. The network device 390 may be or be all or a portion of a network. The network device 390 may include a plurality of network cards 392, of which network cards 392-1, 392-2, and 392-3 are identified in FIG. 2. As shown in FIG. 3, each network card 392-1, -2, -3 may have one port for communications with other equipment such as the test equipment 310. A network card may provide more than one port.

In the exemplary test set-up of FIG. 3, wireless test modules 332 may be installed at ports on network cards 392-1, -2, -3. The wireless test modules 332 may communicate with a test manager 340 within the test equipment 310 via wireless communications links 322 and at least one wireless master transceiver 318 within or coupled to the test equipment 310. Each wireless pluggable test module 332 may have generally the same characteristics as an in-band pluggable test module 230, with the addition of a wireless transceiver for communications with the test equipment 310. The wireless pluggable test modules 332 may be installed in network cards 392-1, -2, -3 in replacement of conventional pluggable transceiver modules. Each wireless pluggable test module 332 may receive electrical power exclusively from the network device.

Each wireless pluggable test module 332 may transmit and receive test traffic via the network device 390. Each wireless pluggable test module 332 may transmit and receive test traffic in accordance with configuration data received from the test manager 340 via the wireless links 322. Each wireless pluggable test module 332 may report test statistics, captured packets, and other test results to the test manager 340 via the wireless links 322. Test results may be reported periodically or upon request during a test session, and/or after the test session.

The wireless communications links 322 may conform to a standard such as an IEEE 802.11 standard or an IEEE 802.16 standard. The wireless communications links 322 may conform to industry working group standards, such as WIFI or WIMAX, which may be based on one of the IEEE standards. The wireless communications links 322 may conform to another existing or future communications standard. The wireless communications links 322 may be proprietary and not conform to an existing standard.

Each wireless pluggable test module 332 may include a time clock synchronized to a master time clock within the test equipment 310. The time clocks within the wireless pluggable test modules 332 may be synchronized by exchanging synchronization packets with the test equipment 310 via the wireless communications links 322. The time clocks within the wireless pluggable test modules 332 may be synchronized to time codes provided to control the wireless communications links 322. Each wireless pluggable test module 332 may include a time code receiver that receives a wireless time code signal which may be, for example, a GPS (global positioning system) signal or a proprietary signal transmitted from the test equipment 310.

No cables are required to couple the individual wireless pluggable test modules 332 to the test equipment 310, which may significantly reduce the cost of testing the network device 390. Additionally, the electrical power required to test the network device 390 may be substantially lower than that of the conventional test set-up of FIG. 1, since the wireless pluggable test modules 332 may be powered by the network device 490 using electrical power previously reserved for pluggable optical transceiver modules.

Although not shown in FIG. 3, a mixture of wireless pluggable test modules and cable connections may be used depending on test requirements. For example 5% or 20% or some other portion of the ports of the network device 390 may be connected via optical cables to port units, such as the port unit 218, with the test equipment 310. The remaining ports of the network device 390 may receive wireless pluggable test modules 332.

When wireless pluggable test modules 332 communicate with the test manager 340 wirelessly, the configuration packets, report packets, and time synchronization packets (if required) communicated between the test modules 332 and the test manager 340 do not add to the load on the network device 390 and may not affect the results of the tests being performed.

Figure 4:
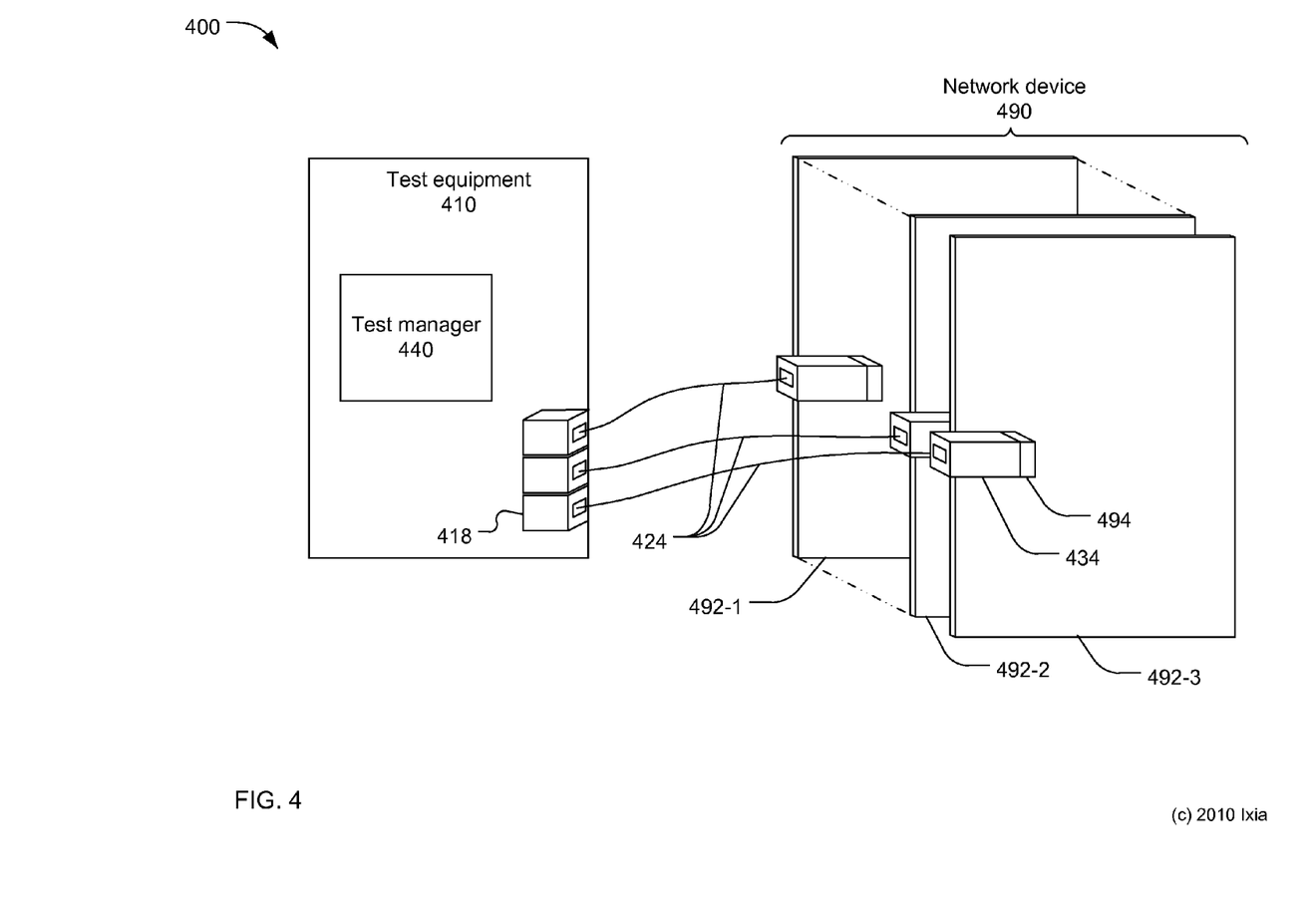
FIG. 4 is a schematic block diagram of a test set-up.

FIG. 4 shows a schematic block diagram of another test set-up 400 including a network device 490 to be tested and test equipment 410. The network device 490 may be a router, a switch, a load balancer, or a cluster of two or more devices. The network device 490 may be or be all or a portion of a network. The network device 490 may include a plurality of network cards 492, of which network cards 492-1, 492-2, and 492-3 are identified in FIG. 4. Each network card 492-1, -2, -3 may have one port for communications with other equipment such as the test equipment 410. A network card may provide more than one port.

In the exemplary test set-up 400 of FIG. 4, the ports on network cards 492-1, -2, -3 may communicate with a test manager 440 within the test equipment 410 via wired pluggable test modules 434, low bandwidth wired communications links 424, and one or more low bandwidth transceivers 418 within the test equipment 410. In this context, the term "low bandwidth" means substantially smaller bandwidth than the bandwidth of the connections between the wired pluggable test modules 434 and the ports of the network device 490. The bandwidth of the low bandwidth communications links 424 may be a small fraction, for example less than a few percent, of the bandwidth of the ports of the network device 490.

The wired pluggable test modules 434 may have generally the same characteristics as the in-band pluggable test modules 230, with the addition of a low bandwidth transceiver for communications with the test equipment 410. The wired pluggable test modules 434 may be installed in network cards 492-1, -2, -3 in replacement of conventional pluggable transceiver modules. Each wired pluggable test module 434 may receive electrical power exclusively from the network device 490. Alternatively, each wired pluggable test module 434 may receive electrical power from the network device 490 and may receive additional electric power from the test equipment 410 via the low bandwidth wired communications links 424. For example, each wired pluggable test module 434 may receive electrical power in accordance with IEEE standard 802.3af for Power Over Ethernet.

Each wired pluggable test module 434 may transmit and receive test traffic via the network device 490. Each wired pluggable test module 434 may transmit and receive test traffic in accordance with configuration data received from the test manager 440 via the low bandwidth communications links 424. Each wired pluggable test module 434 may report test statistics, captured packets, and other test results to the test manager 440 via the low bandwidth communications links 424. Test results may be reported periodically or upon request during a test session, and/or after the test session.

The low bandwidth communications links 424 may conform to a standard such as the USB (Universal Serial Bus) standard, the IEEE 1394 standard or an Ethernet standard. The low bandwidth communications links 424 may conform to another existing or future communications standard. The low bandwidth communications links 424 may be proprietary and not conform to an existing standard. The low bandwidth communications links 424 may be physically implemented, for example, by low-cost twisted pair cables conforming to FCC standard RJ14, RJ25, or RJ45.

Each wired pluggable test module 434 may include a time clock synchronized to a master time clock within the test equipment 410. For example, the time clocks within the wired pluggable test modules 434 may be synchronized by a signal transmitted from the test equipment 410 to each wired pluggable test module 434 via the cables used for the wired communications links 424.

Although not shown in FIG. 4, a mixture of wired pluggable test modules 434 and full-bandwidth cable connections may be used depending on test requirements. For example 5% or 20% or some other portion of the ports of the network device 490 may be connected via optical cables to port units, such as the port unit 218, within the test equipment 410. The remaining ports of the network device 490 may receive wired pluggable test modules 434. The remaining ports of the network device 490 may receive a mixture of wired pluggable test modules 434 and wireless pluggable test modules 332.

When wired pluggable test modules 434 communicate with the test manager 440 via low bandwidth communications links 424 external to the network device 490, the configuration packets, report packets, and time synchronization packets (if required) communicated between the wired test modules 434 and the test manager 440 do not add to the load on the network device 490 and may not affect the results of the tests being performed.

When a network device is tested using wired pluggable test modules 434, cables must be connected between the network device 490 and the test equipment 410. However, the required cables are low cost electrical cables, as opposed to the fiber optic cables required in the conventional test set-up of FIG. 1. Additionally, costly optical transceiver modules are not required at every port of the network device and the test equipment. Additionally, the electrical power required to test the network device may be substantially lower than that of the conventional test set-up, since the wired pluggable test modules 434 may be powered by the network device 490 using electrical power previously reserved for pluggable optical transceiver modules.

When a network device has a large number of ports that receive wireless pluggable test modules, such as the wireless pluggable test module 332, or wired pluggable test modules, such as the wired pluggable test module 434, it may be impractical for a single computing device to serve as a test manager for all of the pluggable test modules. In this situation, a hierarchical test manager may be used, as shown in FIG. 5.

Figure 5:
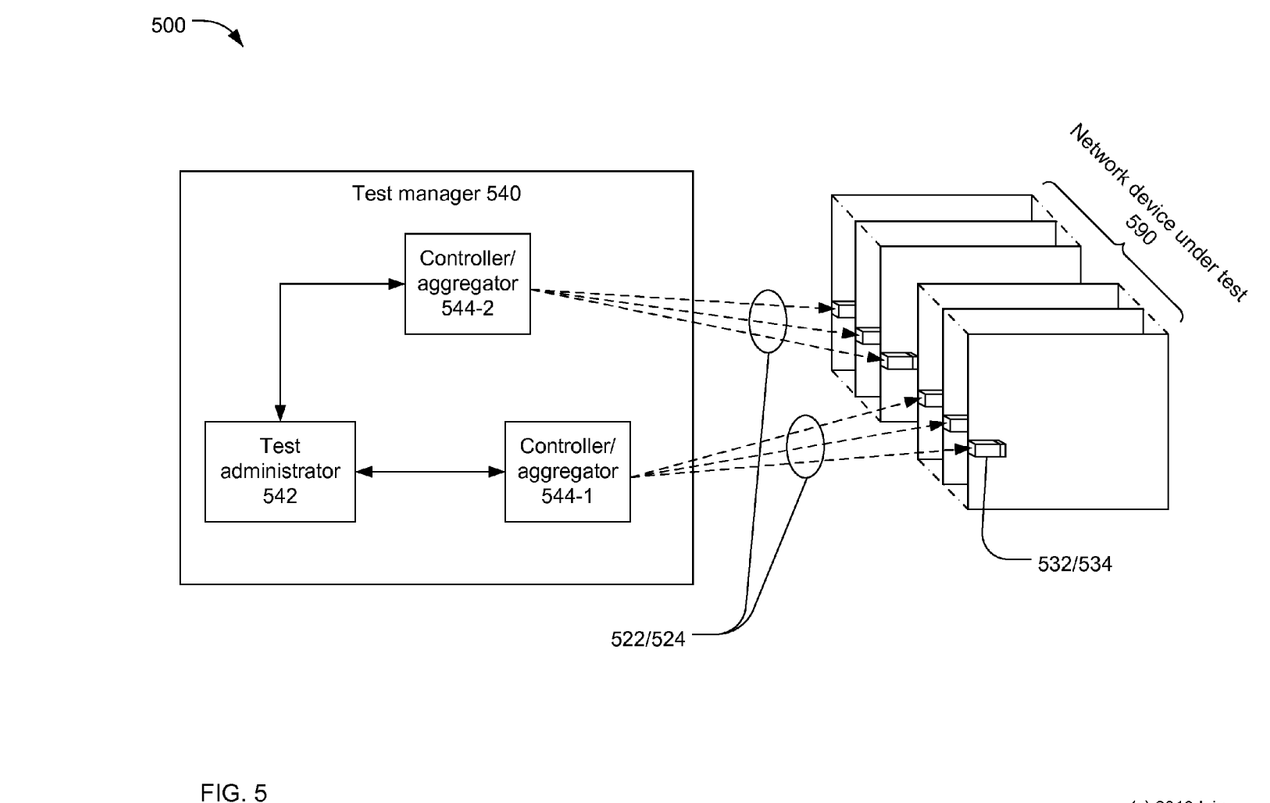
FIG. 5 is a schematic block diagram of a test set-up.

FIG. 5 shows an exemplary test set-up 500 including a plurality of wireless or wired pluggable test modules 532/534 installed in a network device 590. Each of the plurality of pluggable test modules may communicate with a hierarchical test manager 540 via wireless or wired communications links 522/524. The hierarchical test manager 540 may include a master test administrator unit 542 and two or more controller/aggregator units 544-1, 544-2. Each controller/aggregator unit 544-1, 544-2 may communicate with a respective portion of the test modules 532/534. In the example of FIG. 5, each of the two controller/aggregator units 544-1, 544-2 may communicate with approximately half of the test modules 532/534.

A hierarchical test manager may include more than two controller/aggregator units. For example, a network device including 1024 ports may be tested using 32 controller/aggregator units, each of which communicates with 32 pluggable test modules installed in 32 ports of the network device. The 1024-port network device may also be tested using 16 controller/aggregator units, each of which communicates with 64 pluggable test modules, or 64 controller/aggregator units, each of which communicates with 16 pluggable test modules, or some other number of controller/aggregator units.

Each controller/aggregator unit 544-1, 544-2 may provide configuration data to its respective pluggable test modules 532/534. For example, each controller/aggregator unit 544-1, 544-2 may relay configuration data received from the test administrator unit 542 to its respective pluggable test modules 532/534. Each controller/aggregator unit 544-1, 544-2 may generate configuration data based on instructions received from the test administrator unit 542 and may transmit the generated configuration data to its respective pluggable test modules 532/534. Each controller/aggregator unit 544-1, 544-2 may receive traffic statistics and other test results from its respective pluggable test modules. Each controller/aggregator unit 544-1, 544-2 may aggregate the received traffic statistics and report the aggregated traffic statistics to the test administrator unit.

Figure 6:
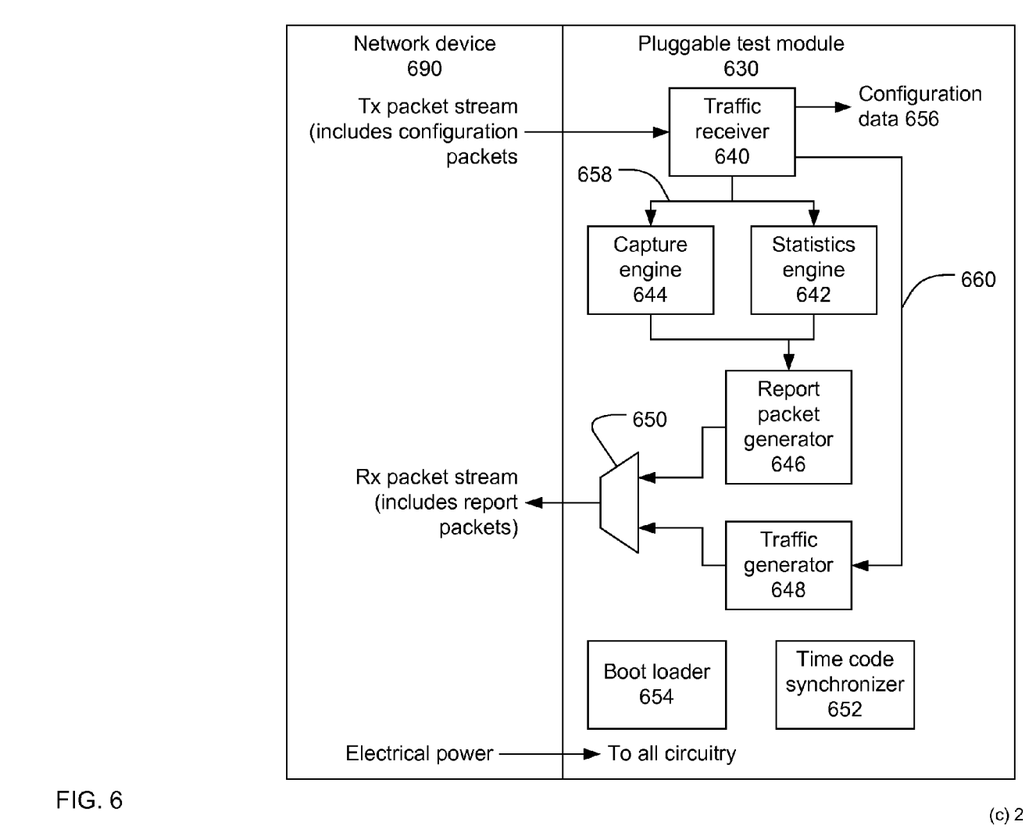
FIG. 6 is a functional block diagram of a test module.

Referring now to FIG. 6, a pluggable test module 630, which may be the pluggable test module 230, may include a traffic receiver 640 to receive a packet stream from a port of a network device 690 to be tested. The received traffic stream may include both test traffic and configuration packets. The configuration packets may convey configuration data 656 that controls at least some the functions of the pluggable test module 630.

The traffic receiver 640 may direct test traffic 658 to a capture engine 644 and/or a statistics engine 642. The capture engine 644 may capture and store received packets in accordance with capture criteria included as part of the configuration data 656. The statistics engine 642 may extract test data from received test traffic and may accumulate traffic statistics for a plurality of packet groups. The accumulated traffic statistics may include quantitative information for each packet group, such as the number of packets received and/or the number of packets received out of sequence. The accumulated traffics statistics may include temporal information such the minimum, maximum, and average latency for packets within each packet group. The configuration data 656 may include data defining traffic statistics to be accumulated by the statistics engine 642.

Packets captured by the capture engine 642 and traffic statistics accumulated by the statistics engine 644 may be formed into test reports by a report packet generator 646. The report packet generator 646 may generate and send transmit test reports via the network device. The report packet generator 646 may transmit test reports periodically or upon request during a test session and/or after the completion of the test session.

The configuration data 656 received via the network device 690 may include stream definition data defining one or more packet streams to be generated by the pluggable test module 630. The stream definition data may include, for example, data defining the type and form of one or more packet streams to be generated, data indicating a transmission rate for each packet stream, instructions for filling variable-content fields within each packet, and other information. A traffic generator 648 may generate and transmit test traffic in accordance with the stream definition data included in the configuration data 656. A multiplexer 650 may insert test reports generated by the report packet generator 646 into the flow of test traffic generated by the traffic generator 648.

The pluggable test module 630 may be configured to maintain stateful connections such as TCP (transmission control protocol connections) or to simulate stateful connections. In either case, the pluggable test modules 630 may generate packets for transmission in reply to specific received packets. For example, the traffic receiver 640 may identify received packets requiring a response, and may provide data or instructions 660 to the traffic generator. The traffic generator 648 may generate a stateful response packet (a response generated with consideration of the state, or prior history, of the connection) or a simulated stateful response packet (a response based solely of the content of the received packet).

The pluggable test module 630 may include a time code synchronizer 652 to synchronize an internal time code generator, or clock, with a master time code generator within test equipment (not shown) coupled to the network device and/or the pluggable test module 630. The time code synchronizer 652 may receive time synchronization packets, for example in conformance with IEEE Standard 1588, from the test equipment via the network device 690 and the traffic receiver 640. The time code synchronizer 652 may include a receiver to receive a synchronization signal or synchronization data directly from the test equipment via a wired or wireless communications link (not shown). The time code synchronizer 652 may include a receiver, such as a GPS receiver, to receive a synchronization signal or synchronization data from some other source.

The pluggable test module 630 may include a boot loader 654 to receive initial configuration data before the traffic receiver 640 and other portions of the pluggable test module 630 are fully configured. The boot loader 654 may be configured to receive at least one type of packet addressed to a unique address pre-assigned to the pluggable test module 630. The boot loader may extract configuration data from these packets and supply the configuration data to other portions of the pluggable test module 630. When the pluggable test module is implemented, at least in part, using field programmable gate arrays or other programmable devices, the boot loader 654 may be configured to extract programming data from received packets and to use the programming data to configure the programmable device or devices.

The pluggable test module 630 may receive electrical power only from the network device. The pluggable test module may be installed in the network device in replacement of pluggable transceiver module. The pluggable test module may be configured to consume no more electrical power than replaced pluggable transceiver module.

Partitioning the pluggable test module 630 into functional elements, as shown in FIG. 6, does not imply a corresponding physical division. All or portions of the traffic receiver 640, the statistics engine 642, the capture engine 646, the traffic generator 648, the multiplexer 650, the time code synchronizer 652 and the boot loader 654 may be implemented in one or more physical devices. All or portions of the pluggable test module 630 may be implemented by one or more application specific integrated circuits (ASICs). All or portions of the pluggable test module 630 may be implemented by one or more field programmable gate arrays (FPGAs), or other programmable devices. Programming code used to configure the one or more FPGAs or programmable devices may be uploaded to the pluggable test module 630 each time power is applied. Each FPGA may revert to an un-programmed state when power is removed. All or portions of the functions of the pluggable test module 630 may be implemented by software or firmware executed by one or more processors within the pluggable test module.

Figure 7:
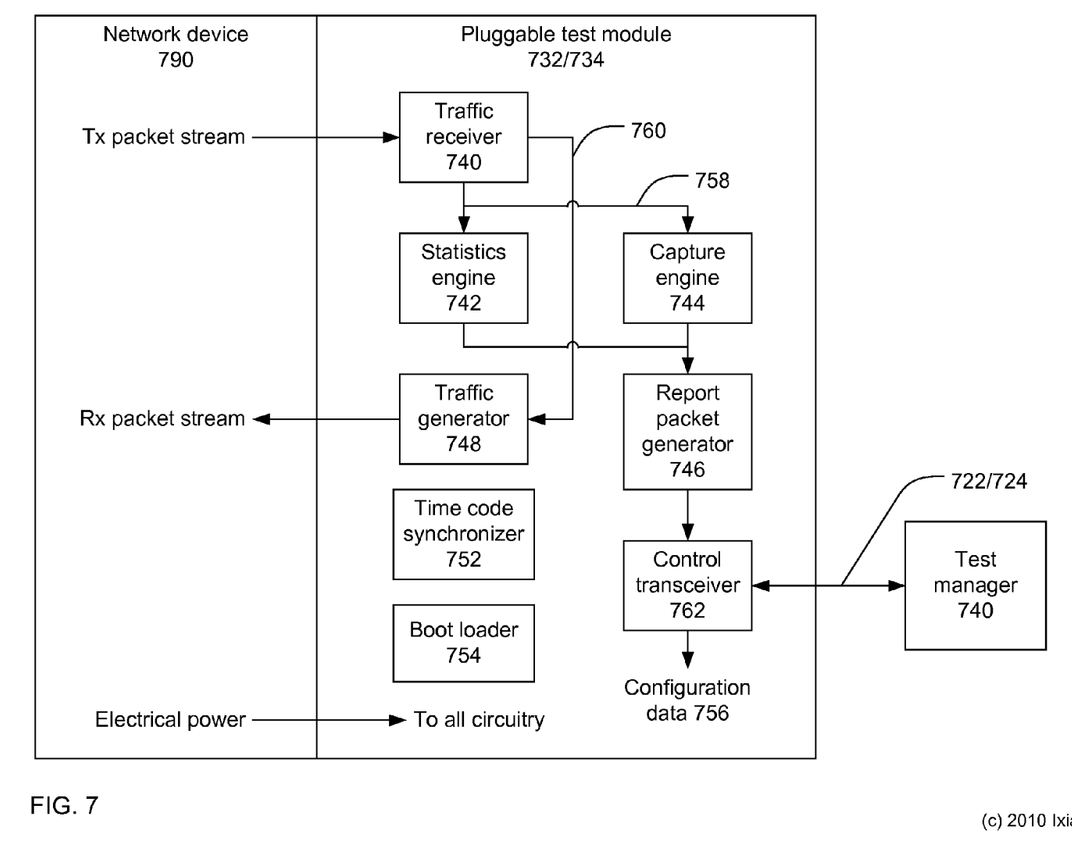
FIG. 7 is a functional block diagram of a test module.

Referring now to FIG. 7, a pluggable test module 732/734, which may be the wireless pluggable test module 332 or the wired pluggable test module 434, may include a traffic receiver 740, a statistics engine 742, a capture engine 744, a report packet generator 746, a traffic generator 748, a multiplexer 750, a time code synchronizer 752 and a boot loader 754. The function of these elements of the pluggable test module 732/734 may be similar to the functions of the comparable elements of the pluggable test module 630. The description of the function of these elements will not be repeated.

The pluggable test module 732/734 may include a control transceiver 762 which may communicate with a test manager 740 via a wireless communications link 722 or a wired communications link 724. Some or all of the programming data used to program FPGAs or other programmable devices within the pluggable test module 732/734 may be received from the test manager 740 via the communications link 722/724 and the control transceiver 762. Some or all of the configuration data 756 that defines and controls the operation of the pluggable test module 732/734 may be received from the test manager 740 via the communications link 722/724 and the control transceiver 762. Some or all of the test reports generated by the report packet generator 746 may be transmitted to the test manager 740 via the control transceiver 762 and the communications link 722/724.

Each pluggable test module 732/734 may receive electrical power exclusively from the network device 790. Alternatively, a wired pluggable test module 734 may receive electrical power from the network device 790 and may receive additional electric power from the test equipment housing the test manager 740 via the low bandwidth wired communications link 724. For example, each wired pluggable test module 734 may receive electrical power in accordance with IEEE standard 802.3af for Power Over Ethernet.

The pluggable test modules 630, 732, and 734 are exemplary, and other pluggable test module configurations are possible. For example, a pluggable test module may be configured to communicate with a test manager via a network device under test and to receive time code synchronization via a separate wired or wireless connection. A pluggable test module may be configured to receive some or all of its electrical power via a wired connection and to communicate with a test manager via a wireless link and/or via a network device under test. A pluggable test module configured to communication with a test manager via a wired or wireless link may also communicate with the test manager via a network device under test.

Description of Processes

Figure 8:
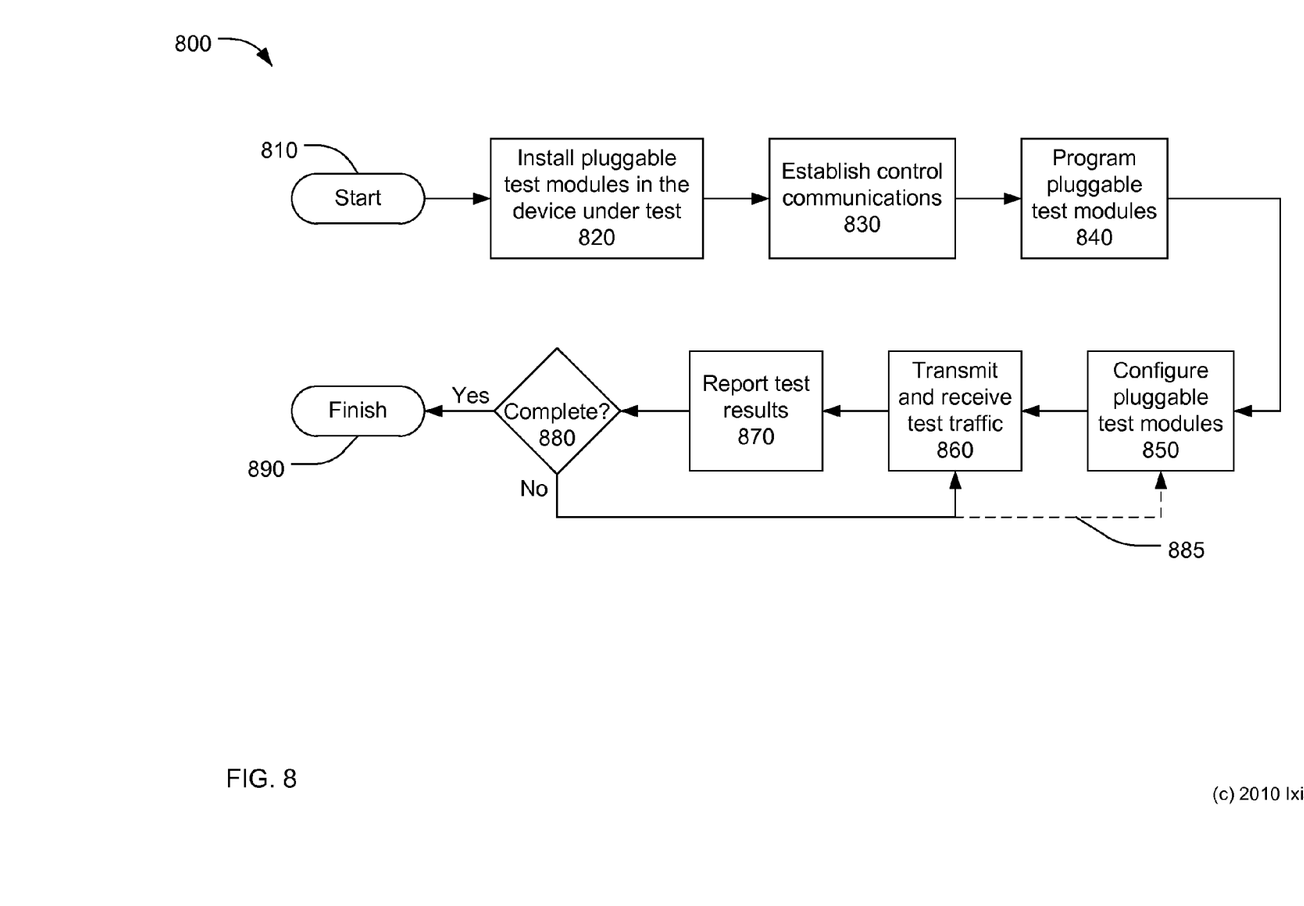
FIG. 8 is a flow chart of a process for testing a network.

Referring now to FIG. 8, a process 800 for testing a network device may start at 810 and end at 890. At least the actions from 860 to 880 may be cyclic and may be repeated a large plurality of times during a test session.

At 820, one or more pluggable test module may be installed in the network device in replacement of (or instead of) a corresponding number of pluggable transceiver modules. The pluggable test modules installed at 820 may be in-band pluggable test modules (such as the in-band pluggable test modules 230), wireless pluggable test modules (such as the wireless pluggable test module 332), wired pluggable test modules (such as the wired pluggable test modules 434) or a combination of these and other types of pluggable test modules. When the pluggable test modules installed at 820 include in-band pluggable test modules, one or more ports of the network device may be connected to corresponding test equipment ports conventionally, for example using pluggable transceiver modules and fiber optic cables. When the pluggable test modules installed at 820 are wireless and/or wired pluggable test modules, a portion of the ports of the network device may optionally be connected to corresponding test equipment ports conventionally. When the pluggable test modules installed at 820 include wired pluggable test modules, low bandwidth wire cables may be installed between each wired pluggable test modules and a corresponding low bandwidth test equipment port.

At 830 communications may be established between a test manager external to the network device and the pluggable test modules installed in the network device at 820. Communications between the test manager and in-band pluggable test modules may be established by exchanging packets via the network device. Communications between wireless and/or wired pluggable test modules and the test manager may be established using wireless communications links or low bandwidth wire communications links, respectively, independent of the network device. In call cases, each pluggable test module may have at least one predetermined unique communications address used for establishing initial communications with the test manager.

At 840 programmable devices, such as field programmable logic arrays, within each pluggable test module may be programmed using programming data received from the test manager via the communications links established at 830. Each of a plurality of pluggable test modules may be programmed in the same manner or differently. When a plurality of pluggable test modules are programmed identically, the programming data may be broadcast from the test manager to the plurality of pluggable test modules, or may be transmitted to the pluggable test modules individually.

After the pluggable test modules are programmed at 840, each pluggable test module may be configured at 850. Specifically, at 850, each pluggable test module may receive configuration data from the test manager via the communications links established at 830. The configuration data may include an address or plurality of addresses which the in-band pluggable test module may emulate during a test session. The configuration data may further include definitions for one or more packet streams that the in-band pluggable test module may generate and transmit during the test session, and instructions for how the in-band pluggable test module should accumulate and report test statistics and other test results. The configuration may also include criteria and instructions for capturing and storing specific received packets.

At least some types of pluggable transceiver modules are hot-swappable, which is to say that the transceiver module may be removed and replaced while the network device is operating. Pluggable test modules for use in replacement of hot-swappable transceiver modules may also be hot-swappable. A hot-swappable test module may be available for programming and configuring immediately after installation in the network device. In this case, establishing communications, programming, and configuring each pluggable test module may begin as soon as each module is installed in the network device, such that the actions at 830, 840, and 850 may be proceeding concurrently for a plurality of pluggable test modules.

After all pluggable test modules have been configured at 850, a test session may begin. At 860, at least some pluggable test modules may transmit test traffic via the network device, and at least some pluggable test modules may receive the test traffic from the network device. Some or all of the pluggable test modules may both transmit and receive test traffic. The pluggable test modules may transmit and receive test traffic in accordance with configuration data received from the test manager at 850.

At 870, some or all of the pluggable test modules may report test statistics, captured packets, and other test results to the test manager. The pluggable test modules may report test results at 870 periodically during a test session and/or upon request from the test manager during the test session. Some or all of the pluggable test modules may report all accumulated test results to the test manager after the test session.

At 880, a determination may be made if the test session is completed. Completing a test of a complex network device may involve transmitting and accumulating traffic statistics for 100,000 or more packet groups including millions of packets. When a determination is made at 880 that the test session is not complete, the test session may continue at 860. In some circumstances, changes may be made to the configuration of at least some pluggable test modules as the test session continues, as indicated by the dashed arrow 885. Although shown as sequential actions for ease of discussion, the actions at 860, 870, and 880 may be performed continuously and essentially in parallel.

When a determination is made at 880 that the test session has been completed, the process 800 may finish at 890.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for testing a network device, comprising:
   one or more test modules configured to plug into respective ports of the network device in replacement of pluggable transceiver modules, each test module including:
      a traffic generator to generate and transmit test traffic via the network device, the test traffic based, at least in part, on stream definition data stored within the test module,
      a traffic receiver to accumulate traffic statistics on test traffic received via the network device, and
      a boot loader configured to receive programming data and to use the programming data to program one or more programmable devices within the test module to implement at least a portion of the traffic generator and the traffic receiver; and
   a test manager external to the one or more test modules, the test manager configured to provide the one or more test modules with the programming data and configuration data including the stream definition data.

2. The system for testing a network device of claim 1, wherein
   each test module receives electrical power from the network device.

3. The system for testing a network device of claim 2, wherein
   each test module receives electrical power exclusively from the network device.

4. The system for testing a network device of claim 1, wherein
   the test manager receives at least one test report from the one or more test modules.

5. The system for testing a network device of claim 1, wherein
   the test manager communicates with the one or more test modules via the network device.

6. The system for testing a network device of claim 1, wherein
   the test manager communicates with the one or more test modules via wireless communications links.

7. The system for testing a network device of claim 1, wherein
the test manager communicates with the one or more test modules via low bandwidth wired connections.

8. A test module for testing a network device, comprising:
a boot loader;
a traffic generator for generating and transmitting test traffic to the network device based, at least in part, on stream definition data stored within the test module; and
a traffic receiver for accumulating traffics statistics for test traffic received from the network device, wherein
the test module is physically and electrically interchangeable with a pluggable transceiver module conforming to a standard, and
at least a portion of the traffic generator and the traffic receiver are implemented in one or more programmable devices programmed by the boot loader using programming data received from a test manager external to the test module.

9. The test module of claim 8, wherein
the test module is configured to receive electrical power from the network device.

10. The test module of claim 9, wherein
the test module is configured to receive electrical power exclusively from the network device.

11. The test module of claim 8, wherein
the test module is configured to plug into a port of the network device in replacement of an XFP (10 Gigabit small form-factor pluggable) transceiver module.

12. The test module of claim 11, wherein
a maximum power consumption of the test module power is less than or equal to 3.5 Watts.

13. The test module of claim 8, wherein
the test module is configured to plug into a port of the network device in replacement of a SFP+(Small form-factor pluggable) transceiver module.

14. The test module of claim 13, wherein
a maximum power consumption of the test module power is less than or equal to 1.5 Watts.

15. The test module of claim 8, wherein
the test module is configured to plug into a port of the network device in replacement of a CFP (C form-factor pluggable) transceiver module.

16. The test module of claim 15, wherein
a maximum power consumption of the test module power is less than or equal to the maximum power consumption of a CFP transceiver module.

17. The test module of claim 8, wherein
the traffic generator is configured to generate test traffic in accordance with stream definition data received from the test manager, and
the traffic receiver is configured to send at least one test report to the test manager.

18. The test module of claim 8, wherein
the test module is configured to communicate with the test manager via the network device.

19. The test module of claim 8, wherein
the test module is configured to communicate with the test manager via a wireless communication link.

20. The test module of claim 8, wherein
the test module is configured to communicate with the test manager via a low bandwidth wired connection.

21. The test module of claim 20, wherein
the test module is configured to receive electrical power from the network device and via the low bandwidth wired connection.

22. The test module of claim 8, further comprising:
a capture engine to capture and store received packets in accordance with capture criteria provided by the test manager.

23. A method for testing a network device, comprising:
plugging a test module into a port of the device under test in replacement of a pluggable optics module;
a boot loader within the test module receiving programming data from a test manager external to the test module;
the boot loader programming one or more programmable devices within the test module using the programming data;
after the programming, the test module generating and transmitting test traffic via the network device, the test traffic based, at least in part, on stream definition data received from the test manager and stored within the test module; and
the test module accumulating traffic statistics on test traffic received via the network device.

24. The method for testing a network device of claim 23, further comprising:
the test module receiving electric power from the device under test.

25. The method for testing a network device of claim 24, further comprising:
the test module receiving electric power exclusively from the device under test.

26. The method for testing a network device of claim 23, further comprising:
the test module sending at least one test report to the test manager.

27. The method for testing a network device of claim 23, further comprising:
the test module communicating with the test manager via the network device.

28. The method for testing a network device of claim 23, further comprising:
the test module communicating with the test manager via a wireless communications link.

29. The method for testing a network device of claim 23, further comprising:
the test module communicating with the test manager via a low bandwidth wired connection.

30. The method for testing a network device of claim 23 further comprising:
the test module capturing and storing received packets in accordance with capture criteria; and
the test module generating a test report based on the captured received packets.

31. The system for testing a network device of claim 1, wherein
at least some of the test traffic generated by the traffic generator is generated in response to test traffic received by the traffic receiver.

32. The test module of claim 8, wherein
at least some of the test traffic generated by the traffic generator is generated in response to test traffic received by the traffic receiver.

33. The method for testing a network device of claim 23, wherein generating test traffic further comprises:
generating at least some test traffic in response to received test traffic.

* * * * *